United States Patent
Shin et al.

(10) Patent No.: US 11,765,781 B2
(45) Date of Patent: *Sep. 19, 2023

(54) METHOD AND APPARATUS FOR RADIO LINK MONITORING AND RADIO LINK FAILURE IN SIDELINK COMMUNICATION

(71) Applicant: Samsung Electronics Co., Ltd., Suwon-si (KR)

(72) Inventors: Cheolkyu Shin, Suwon-si (KR); Hyunseok Ryu, Suwon-si (KR); Jinyoung Oh, Suwon-si (KR); Jeongho Yeo, Suwon-si (KR); Sungjin Park, Suwon-si (KR); Jonghyun Bang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,592

(22) Filed: May 23, 2022

(65) Prior Publication Data

US 2022/0287128 A1 Sep. 8, 2022

Related U.S. Application Data

(63) Continuation of application No. 16/749,859, filed on Jan. 22, 2020, now Pat. No. 11,343,870.

(30) Foreign Application Priority Data

Jan. 22, 2019 (KR) ........................ 10-2019-0008354

(51) Int. Cl.
*H04W 76/18* (2018.01)
*H04L 5/00* (2006.01)
(Continued)

(52) U.S. Cl.
CPC ............ *H04W 76/18* (2018.02); *H04L 5/0055* (2013.01); *H04W 4/40* (2018.02); *H04W 24/08* (2013.01);
(Continued)

(58) Field of Classification Search
CPC ....... H04W 76/18; H04W 4/40; H04W 24/08; H04W 56/001; H04W 80/08;
(Continued)

(56) References Cited

U.S. PATENT DOCUMENTS

2008/0019279 A1 1/2008 Kim et al.
2013/0324114 A1 12/2013 Raghothaman et al.
(Continued)

FOREIGN PATENT DOCUMENTS

WO 2020147046 A1 7/2020

OTHER PUBLICATIONS

Vivo, "Enhancements of Uu link to control sidelink", 3GPP TSG RAN WG1 Ad-Hoc Meeting 1901, Jan. 21-25, 2019, R1-1900122, 8 pages.

(Continued)

*Primary Examiner* — Ayaz R Sheikh
*Assistant Examiner* — Tarell A Hampton

(57) ABSTRACT

Disclosed are a communication scheme and a system thereof for converging an IoT technology and a 5G communication system for supporting a high data transmission rate beyond that of a 4G system. The disclosure may be applied to a smart service (for example, a smart home, a smart building, a smart city, a smart car or connected car, healthcare, digital education, retail business, a security and security related service, or the like) on the basis of a 5G communication technology and an IoT related technology. Disclosed are a
(Continued)

method and apparatus for performing radio link monitoring (RLM) and radio link failure (RLF) in a vehicle communication (V2X) system.

12 Claims, 10 Drawing Sheets

(51) Int. Cl.
    *H04W 80/08*    (2009.01)
    *H04W 4/40*     (2018.01)
    *H04W 56/00*    (2009.01)
    *H04W 24/08*    (2009.01)
    *H04W 92/18*    (2009.01)

(52) U.S. Cl.
    CPC ......... *H04W 56/001* (2013.01); *H04W 80/08* (2013.01); *H04W 92/18* (2013.01)

(58) Field of Classification Search
    CPC ..... H04W 92/18; H04W 8/005; H04W 76/19; H04W 76/23; H04W 72/042; H04W 76/14; H04L 5/0055
    See application file for complete search history.

(56) References Cited

U.S. PATENT DOCUMENTS

| | | |
|---|---|---|
| 2014/0155114 A1 | 6/2014 | Wu |
| 2015/0271717 A1 | 9/2015 | Moon et al. |
| 2015/0271861 A1 | 9/2015 | Li et al. |
| 2015/0296558 A1 | 10/2015 | Seo et al. |
| 2015/0365994 A1 | 12/2015 | Yu et al. |
| 2016/0198404 A1 | 7/2016 | Tsiatsis et al. |
| 2016/0198504 A1 | 7/2016 | Seo et al. |
| 2019/0319723 A1 | 10/2019 | Axmon et al. |
| 2019/0320361 A1 | 10/2019 | Uchiyama et al. |
| 2019/0357292 A1 | 11/2019 | Cirik et al. |
| 2020/0067762 A1 | 2/2020 | Tang |
| 2020/0280398 A1 | 9/2020 | Hwang et al. |
| 2022/0029691 A1* | 1/2022 | Yu .......................... H04W 76/19 |

OTHER PUBLICATIONS

Vivo, "Sidelink unicast procedures in NR", 3GPP TSG-RAN WG2 Meeting #104, Nov. 12-16, 2018, R2-1817108, 4 pages.
Supplementary European Search Report dated Sep. 9, 2022 in connection with European Patent Application No. 20 74 5828, 10 pages.
International Search Report dated May 6, 2020, in connection with International Patent Application No. PCT/KR2020/001092, 3 pages.
Written Opinion of the International Searching Authority dated May 6, 2020, in connection with International Patent Application No. PCT/KR2020/001092, 6 pages.
Samsung, "Consideration on sidelink RLM," R1-1901055, 3GPP TSG RAN WG1 Ad-Hoc Meeting 1901, Jan. 21-25, 2019, 2 pages.

* cited by examiner

METHOD AND APPARATUS FOR RADIO LINK MONITORING AND RADIO LINK FAILURE IN SIDELINK COMMUNICATION

CROSS-REFERENCE TO RELATED APPLICATION

This application is a continuation of application Ser. No. 16/749,859, filed Jan. 22, 2020, now U.S. Pat. No. 11,343,870, which is based on and claims priority under 35 U.S.C. 119 to Korean Patent Application No. 10-2019-0008354, filed on Jan. 22, 2019, in the Korean Intellectual Property Office, the disclosures of which are herein incorporated by reference in their entirety.

BACKGROUND

1. Field

The disclosure relates to a mobile communication system, and relates to a method in which a vehicle terminal, which supports vehicle communication, performs transmission or reception of a signal with another vehicle terminal and a pedestrian portable terminal, using a sidelink, and an apparatus therefor.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

Study on a vehicle-to-everything (V2X), which uses a 5G communication system, is being conducted, and it is expected to provide various services to users by using V2X.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a V2X system, and particularly, is to provide a method and apparatus for performing radio link monitoring (RLM) and radio link failure (RLF) in the process in which a vehicle terminal, which supports V2X, performs transmission or reception of information with another vehicle terminal and a pedestrian portable terminal using a sidelink.

The present disclosure has been made to address the above-mentioned problems and disadvantages, and to provide at least the advantages described below.

In accordance with an aspect of the present disclosure, A method performed by a terminal in a communication system is provided. The method includes transmitting, to another terminal, data on a sidelink, determining whether a radio link failure (RLF) associated with the sidelink is detected, and in case that the RLF is detected, transmitting, to a base station, information indicating that the RLF associated with the sidelink occurs, wherein the terminal is connected with the base station.

In accordance with another aspect of the present disclosure, A terminal in a communication system is provided. The terminal includes a transceiver and a controller configured to transmit, to another terminal via the transceiver, data on a sidelink, determine whether a radio link failure (RLF) associated with the sidelink is detected, and in case that the RLF is detected, transmit, to a base station via the transceiver, information indicating that the RLF associated with the sidelink occurs, wherein the terminal is connected with the base station. The disclosure proposes a method in which a terminal performs radio link monitoring (RLM) and radio link failure (RLF) in sidelink communication. According to the disclosure, sidelink unicast and groupcast communication may be more reliably supported.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1A:
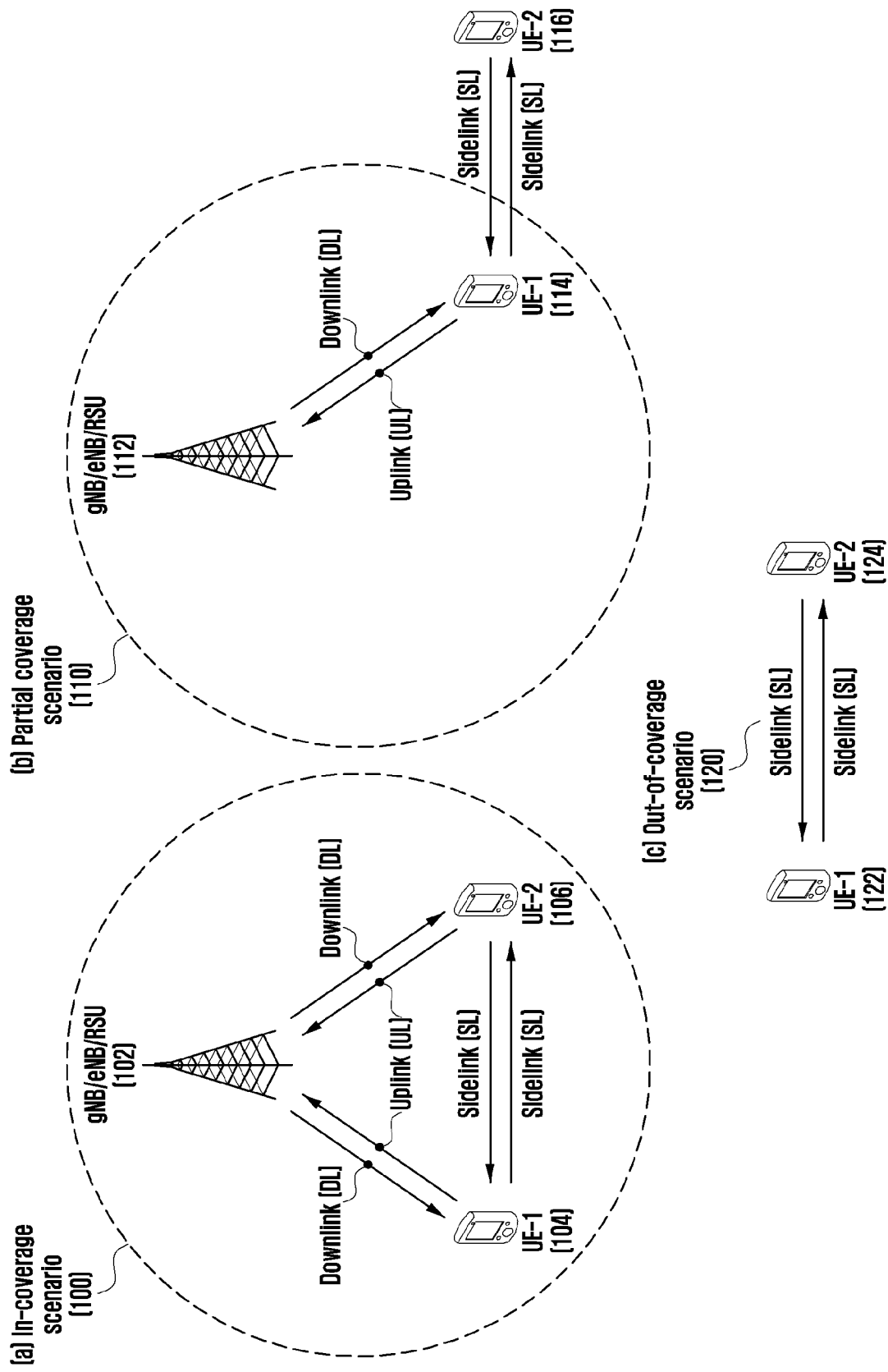
FIG. 1A illustrates a diagram of an example of a system according to an embodiment.

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and methods of achieving the same will be apparent by referring to embodiments of the disclosure as described below in detail in conjunction with the accompanying drawings. However, the disclosure is not limited by the embodiments described below, but may be implemented in various different ways. The embodiments are provided to enable the disclosure to be complemented, and to completely show the scope of the disclosure to those skilled in the art. The disclosure is merely defined by the scope of the claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, " . . . unit" may include one or more processors.

The detailed descriptions of the embodiments are provided mainly with reference to New RAN (NR), which is radio access network, and a packet core, which is a core network (a 5G system, a 5G core network, or an NG core: next generation core), in the 5G mobile communication standard specified by the 3GPP which is a standard organization for a mobile communication standard. However, the subject matter of the disclosure can be slightly modified without departing from the scoped of the disclosure, and might be applied to other communication systems having a similar technical background. The modification and application thereof may be determined by those skilled in the art.

In a 5G system, in order to support automation of a network, a network data collection and analysis function (NWDAF) may be defined, which is a network function that provides a function of analyzing and providing data collected in a 5G network. The NWDAF may provide, to an unspecified network function (NF), a result obtained by collecting/storing/analyzing information from the 5G network, and the analysis result may be independently used by each NF.

For ease of description, some of the terms and names that are defined in the 3rd generation partnership project long term evolution (3GPP LTE) standard (or standards of 5G, NR, LTE, or systems similar thereto) may be used. However, the disclosure is not limited to the terms and names, and may be equally applied to a system that is based on another standard.

Hereinafter, terms for identifying access nodes, terms that refer to network entities, terms that refer to messages, terms that refer to interfaces between network entities, terms for various types of identification information, and the like are merely used for ease of description. Therefore, terms are not limited to the terms used in the disclosure, and other terms that that refer to subjects having equivalent technical meanings may be used.

In order to meet wireless data traffic demands that have increased after commercialization of the 4G communication system, efforts to develop an improved 5G communication system (new radio (NR)) are being made. In order to achieve a high data transmission rate, the 5G communication system is designed to use resources in an ultra-high frequency (mmWave) band (e.g., a 28 GHz frequency band). In the 5G communication system, technologies such as beamforming, massive MIMO, full dimensional MIMO (FD-MIMO), an array antenna, analog beam-forming, and a large scale antenna are being discussed to mitigate a propagation path loss in the ultra-high frequency band and to increase a propagation transmission distance. In addition, unlike LTE, the 5G communication system supports various subcarrier spacing, such as 30 kHz, 60 kHz, 120 kHz, and the like including 15 kHz. A physical control channel is encoded using polar coding, and a physical data channel is encoded using low density parity check (LDPC). Furthermore, a cyclic prefix OFDM (CP-OFDM), as well as a DFT spread OFDM (DFT-S-OFDM), may be used as a waveform for uplink transmission. LTE supports hybrid ARQ (HARQ) retransmission performed in units of transport blocks (TBs). Conversely, a 5G system may additionally support HARQ retransmission in units of code block groups (CBGs), in which code blocks (CBs) are bound.

In the case of vehicle communication, an LTE-based V2X has been standardized based on a device-to-device (D2D) communication structure, in 3GPP Rel-14 and Rel-15. Currently, an effect to develop V2X based on 5G new radio (NR) is being made. In NR V2X, it is expected to support unicast communication between terminals, groupcast (or multicast) communication, and broadcast communication. Unlike LTE V2X which is for transmission or reception of basic safety information, which is needed when a vehicle drives on a road, the NR V2X is to provide an advanced service such as platooning, advanced driving, an extended sensor, or remote driving.

Hereinafter, a sidelink refers to a signal transmission or reception path between terminals, which may be interchangeably used with a PC5 interface. Hereinafter, a base station is a subject that performs resource allocation for a terminal, and may be a base station that supports both V2X communication and normal cellular communication or may be a base station that supports only V2X communication. That is, the base station refers to a 5G base station (gNB), a 4G base station (eNB), or a road site unit (RSU). A terminal may be a mobile station, and may be a vehicle that supports vehicular-to-vehicular (V2V) communication, a vehicle or a pedestrian's handset (i.e., a smart phone) that supports vehicular-to-pedestrian (V2P) communication, a vehicle that supports vehicular-to-network (V2N) communication, a vehicle that supports vehicular-to-infrastructure (V2I) communication, a radio side unit (RSU) equipped with a terminal function, an RSU equipped with a base station function, an RSU equipped with some of a base station function and some of a terminal function, or the like. A base station and a terminal may be connected via a Uu interface.

In a sidelink of V2X and D2D based on a legacy LTE system, only broadcast communication is supported, and radio link monitoring (RLM) and radio link failure (RLF) functions are not supported. Particularly, RLM is a function of measuring and monitoring a communication link quality. According to the result of RLM, a terminal may report a link quality to a higher layer. Based on the same, the hither layer may determine whether to maintain the current communication link or to declare RLF and connect a link again. In the case of NR V2X, unicast between terminals and groupcast communication are considered. Accordingly, in order to secure continuous connection of a communication link, the RLM and RLF functions may be needed.

Particularly, if the RLM and RLF functions are not supported in an advanced scenario, such as platooning, advanced driving, an extended sensor, remote driving, or the like which is considered in the NR V2X, continuous connection of the service may not be secured which may badly affect the performance of the service being provided. For example, in the case of remote driving, if restoration of a link via RLM and RLF is not attempted even though a link quality is poor, safety of a vehicle may not be secured. In addition, in the case of an existing Uu interface between a base station and a terminal, the base station transmits a measurement signal for RLM and the terminal performs RLM and RLF using the same. In the case of a sidelink of V2X, which is communication between terminals, a terminal that performs transmission, as well as a terminal that receives data, is capable of decreasing power consumption via RLM and RLM, if a link quality is poor. In the case in which RLM and RLF are supported in a terminal that transmits data, if the link quality associated with transmission is poor, a leader terminal of a group in a service scenario, such as platooning, may transfer a leader function to another terminal so as to support more reliable platooning.

In order to support the above-described scenario, unlike the legacy LTE V2X technology, the NR V2X may need to perform RLM and RLF in the process in which a vehicle terminal performs transmission or reception of information with another terminal and a pedestrian portable terminal, using a side link. However, there is no discussion thereon. Therefore, the disclosure provides a method of selecting and configuring a measurement signal for RLM. Also, there are provided a method in which a terminal performs RLM using a measurement signal and operates according to an RLM result, and an apparatus therefor.

Embodiments are provided to support the above-described scenario, and are to provide a method and apparatus for performing RLM and RLF between terminals in a sidelink environment where unicast and group cast communication are supported.

First Embodiment

FIG. 1A illustrates a diagram of an example of a system according to an embodiment.

According to FIG. 1A, an in-coverage scenario 100 is an example of the case in which all V2X terminals (UE-1 104 and UE-2 106) are located within a coverage area of a base station 102.

In this instance, all V2X terminals 104 and 106 may receive data and control information from the base station 102 via a downlink (DL), or may transmit data and control information to the base station via an uplink (UL). In this instance, the data and control information may be data and control information for V2X communication. Alternatively, the data and control information may be data and control information for normal cellular communication. Also, V2X terminals may transmit or receive data and control information for V2X communication, via a sidelink (SL).

A partial coverage scenario 110 is an example of the case in which, among V2X terminals, UE-1 114 is located within a coverage area of a base station 112, and the UE-2 116 is located outside the coverage area of the base station 112. An example according to the scenario 110 may be referred to as an example associated with partial coverage.

The UE-1 114 located within the coverage area of the base station 112 may receive data and control information from the base station 112 via a downlink (DL), or may transmit data and control information to the base station 112 via an uplink (UL).

The UE-2 116 which is located outside the coverage area of the base station 112 may not be capable of receiving data and control information from the base station 112 via a downlink, and may not be capable of transmitting data and control information to the base station 112 via an uplink.

The UE-2 116 and UE-1 114 may perform transmission or reception of data and control information for V2X communication via a sidelink.

Out-of-coverage 120 is an example of the case in which all V2X terminals 122 and 124 are located outside a coverage area of a base station (out-of-coverage).

Therefore, the UE-1 122 and the UE-2 124 may not be capable of receiving data and control information from a base station via a downlink, and may not be capable of transmitting data and control information to the base station via an uplink. The UE-1 122 and the UE-2 124 may perform transmission or reception of data and control information for V2X communication, via a sidelink.

Figure 1B:
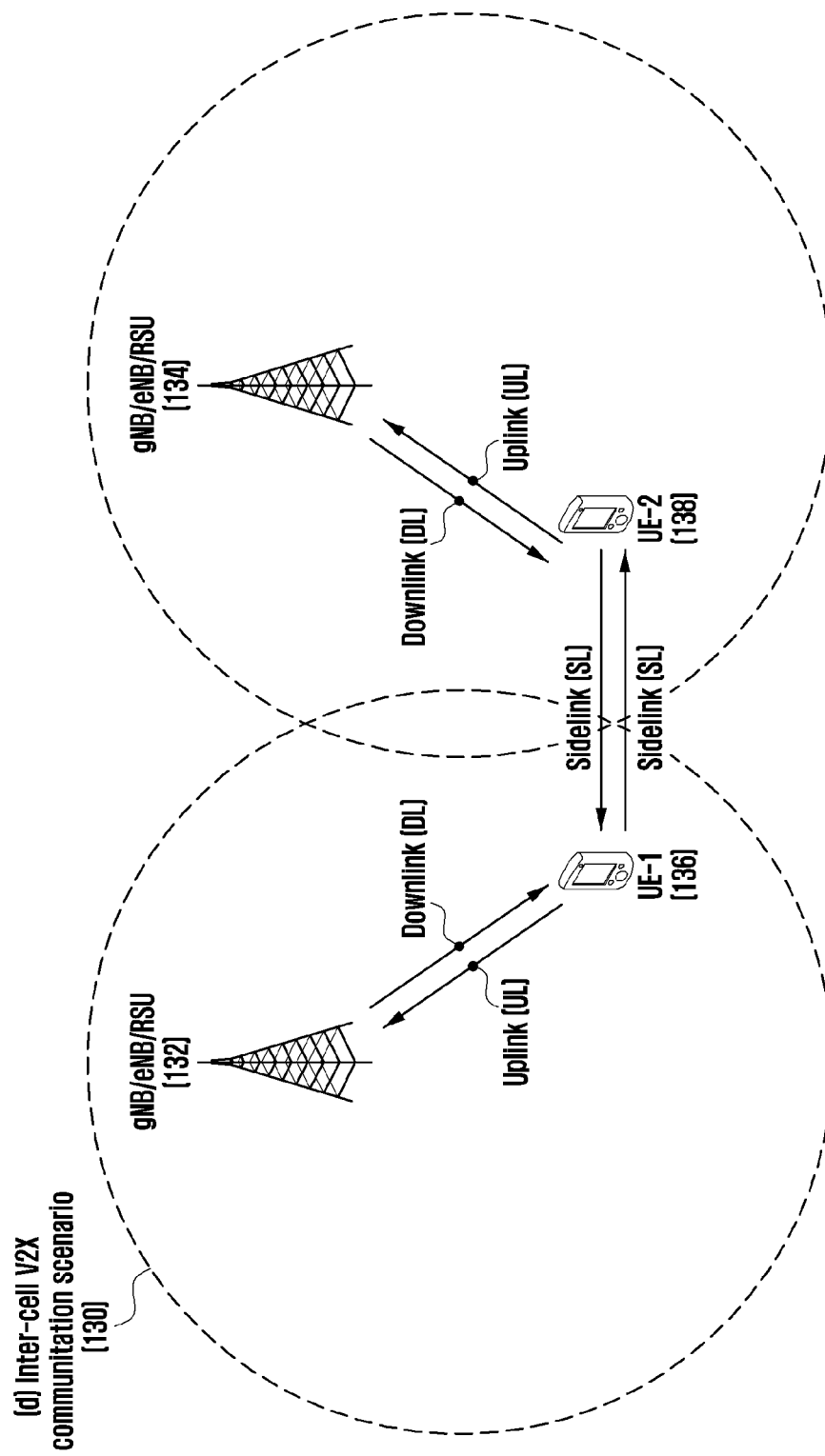
FIG. 1B illustrates a diagram of another example of a system according to an embodiment.

FIG. 1B illustrates a diagram of another example of a system according to an embodiment.

According to FIG. 1B, an inter-cell V2X communication scenario 130 is an example of the case of performing V2X communication between terminals located in different cells. Particularly, it is illustrated that a V2X transmission terminal and a V2X reception terminal access (RRC connection state) or camp on (RRC connection released state, that is, RRC idle state) different base stations, in the scenario 130. In this instance, UE-1 136 may be a V2X transmission terminal and UE-2 138 may be a V2X reception terminal. Alternatively, the UE-1 136 may be a V2X reception terminal and the UE-2 138 may be a V2X transmission terminal. The UE-1 136 may receive a V2X-dedicated system information block (SIB) from a base station 132 that the UE-1 136 accesses (or camps on), and the UE-2 138 may receive a V2X-dedicated SIB from another base station 134 that the UE-2 138 accesses (or camps on). In this instance, the V2X-dedicated SIB information that the UE-1 136 receives and the V2X-dedicated SIB information that the UE-2 138 receives may be different from each other. Therefore, in order to perform V2X communication between terminals located in different cells, the information may be unified, or flexible parameter configuration may be supported via a related parameter configuration method and apparatus of the disclosure.

Although FIG. 1 illustrates a V2X system including two terminals (UE-1 and UE-2) for ease of description, the disclosure is not limited thereto. Also, the uplink and the downlink between a base station and V2X terminals may be referred to as a Uu interface, and the sidelink between V2X terminals may be referred to as a PC5 interface. Therefore, the terms may be interchangeably used in the disclosure.

Figure 2:
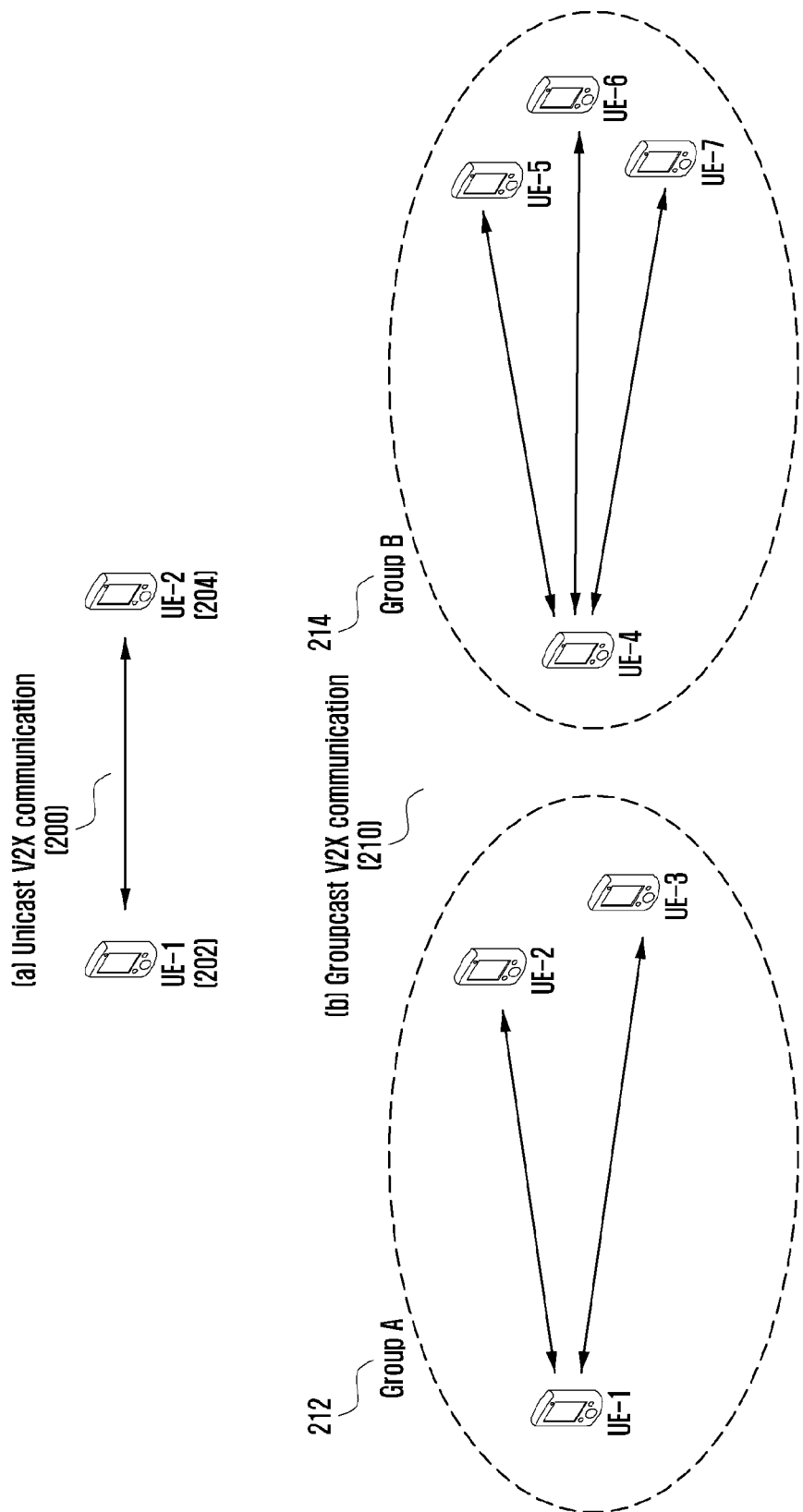
FIG. 2 illustrates a diagram of an example of a V2X communication method implemented via a sidelink.

FIG. 2 illustrates a diagram of an example of a V2X communication method implemented via a sidelink.

According to FIG. 2, as shown in diagram 200, a Tx terminal (UE-1 202 or UE-2 204) and an Rx terminal (UE-2 204 or UE-1 202) may perform one-to-one communication, which may be referred to as unicast communication.

As shown in diagram 210, TX terminals and RX terminals may perform one-to-multiple communication, which may be referred to as a groupcast or multicast.

In diagram 210, UE-1, UE-2, and UE-3 are included in a single group (group A) 212 and perform groupcast communication. UE-4, UE-5, UE-6, and UE-7 are included in another group (group B) 214 and perform groupcast communication. Each terminal performs groupcast communication within a group which the corresponding terminal belongs to, and communication between different groups may not be performed. Although diagram 210 illustrates that two groups, the disclosure is not limited thereto.

Although not illustrated in FIG. 2, V2X terminals may perform broadcast communication. The broadcast communication refers to the case in which all V2X terminals receive data and control information that a V2X transmission terminal transmits via a sidelink. For example, if it is assumed that a UE-1 is a transmission terminal for broadcast in diagram 210, the all terminals (UE-2, UE-3, UE-4, UE-5, UE-6, and UE-7) may receive data and control information that UE-1 transmits.

Supporting a process in which a vehicle terminal transmits data to only a single predetermined node via a unicast, and a process in which a vehicle terminal transmits data to multiple predetermined nodes via a groupcast may be considered in NR V2X, unlike LTE V2X. For example, unicast and groupcast technologies may be effectively used when a service scenario, such as platooning, is considered. Platooning is a technology in which two or more vehicles connect to a single network, and move by being bounded as a group. Particularly, unicast communication may be needed when a leader node in a group configured by platooning desires to control a predetermined node, and group cast communication may be needed when a leader node desires to control a group including multiple predetermined nodes at the same time.

Figure 3:
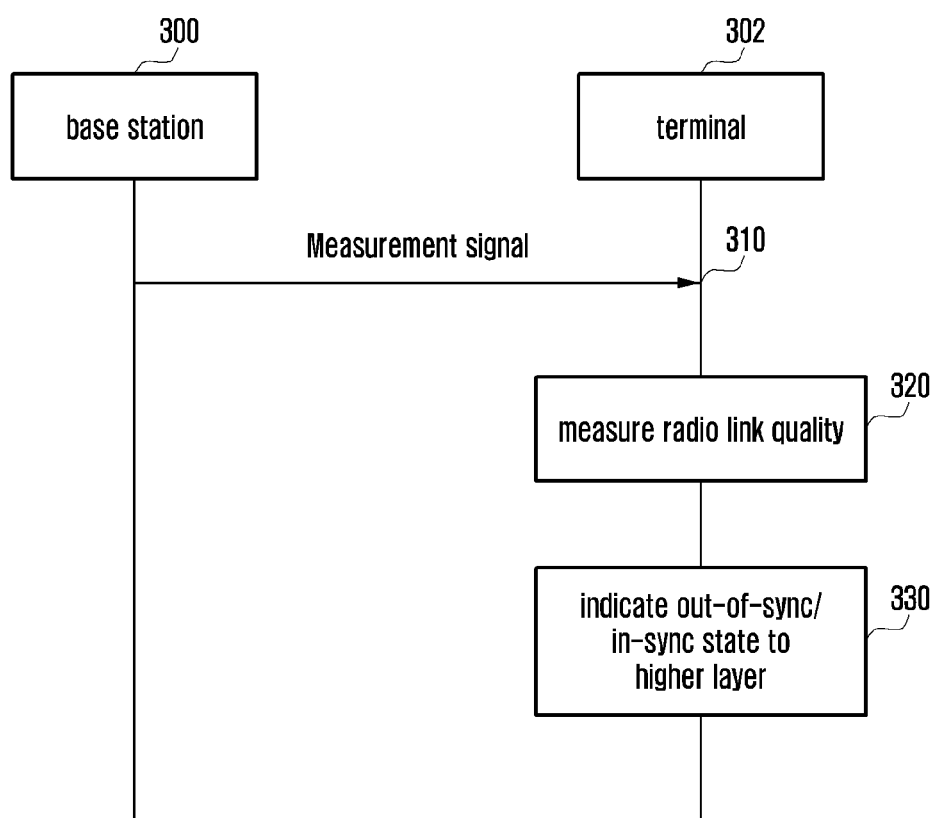
FIG. 3 illustrates a diagram of a method in which RLM is performed between a base station and a terminal in a legacy LTE and an NR system.

FIG. 3 illustrates a diagram of a method in which RLM is performed between a base station and a terminal in a legacy LTE and an NR system.

For RLM, a terminal 302 may receive, from a base station 300, a measurement signal as follows in operation 310.

An LTE terminal may use a cell-specific reference signal (CRS) as a measurement signal for RLM [please see TS 36.213 Section 4.2.1]

An NR terminal may use a synchronization signal/physical broadcast channel (SS/PBCH) block or a channel state information reference signal (CSI-RS), or may use both of them, as a measurement signal for RLM [please see TS 36.213 Section 5].

Subsequently, the terminal measures a radio link quality using the measurement signal in operation 320. Subsequently, the terminal indicates an out-of-sync state or an in-sync state to a higher layer using a communication link quality measurement result in operation 330. Particularly, if the communication link quality is poorer than a threshold point $Q_{out}$, the terminal indicates that the link quality is "out-of-sync" to the higher layer. However, if the communication link quality is better than a threshold point $Q_{in}$, the terminal indicates that the link quality is "in-sync" to the higher layer. The threshold points $Q_{out}$ and $Q_{in}$ are defined as block error rates (BLER) in RAN4 standard [please see TS 36.133 Section 7.11 for an LTE terminal, and please see TS 38.133 Section 8.1 for an NR terminal].

Based on the result of RLM in operation 330, the terminal may perform an RLF related operation. If "out-of-sync" is successively indicated by a lower layer, the higher layer may operate an RLM-related timer. If "in-sync" is successfully indicated by the lower layer, an RLM-related timer may be suspended. If the timer, which starts operating, expires, the terminal determines that it is RLF, suspends an RLM-related timer, and performs two operations as follows.

The terminal suspends uplink transmission to a base station.
Uplink transmission, such as semi-persistent scheduling (SPS), channel state information including a channel quality indicator (CQI), a sounding reference signal (SRS), a scheduling request (SR), or the like, may be released.
A cell selection procedure is performed for restoration of a link.

For more detailed related operations, please see TS 36.331 for an LTE terminal, and please see TS 38.331 for an NR terminal.

Figure 4:
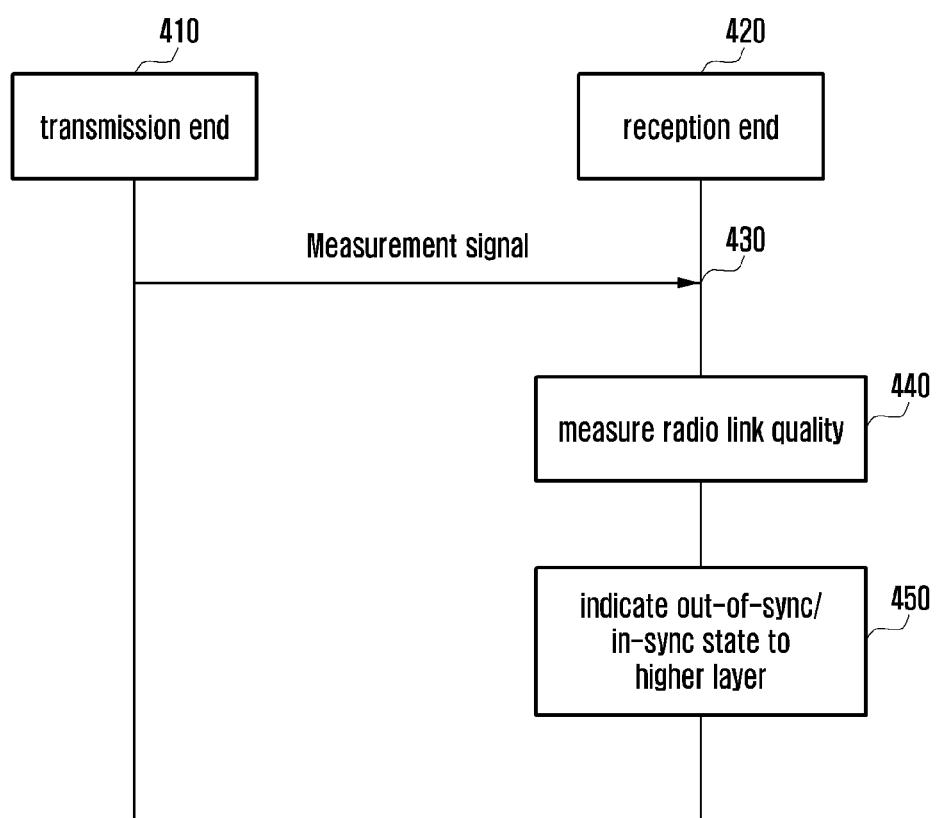
FIG. 4 illustrates a diagram of an example of a method of performing RLM in an NR V2X system.

FIG. 4 illustrates a diagram of an example of a method of performing RLM in an NR V2X system. An NR V2X system may consider the following methods for RLM.

perform RLM in only a reception end
perform RLM in a transmission end and a reception end The method of performing RLM in only the reception end is illustrated in FIG. 4. FIG. 4 illustrates a transmission end 410 and a reception end 420. Generally, a transmission end and a reception end may be understood as a subject of transmitting a signal and a subject of receiving a signal. In the V2X system, a terminal may be a transmission end or a reception end. Also, the reception end 420 may be a single terminal or may be multiple terminals. In a scenario such as platooning, the reception end 420 may be multiple terminals. For RLM, the transmission end transmits a measurement signal and the reception end receives the same in operation 430. Subsequently, the reception end measures a radio link quality using the measurement signal in operation 440. Subsequently, the reception end indicates an out-of-sync state or an in-sync state to a higher layer using a communication link quality measurement result in operation 450. Here, the terms, "out-of-sync" or "in-sync" may be replaced with other terms.

Figure 5:
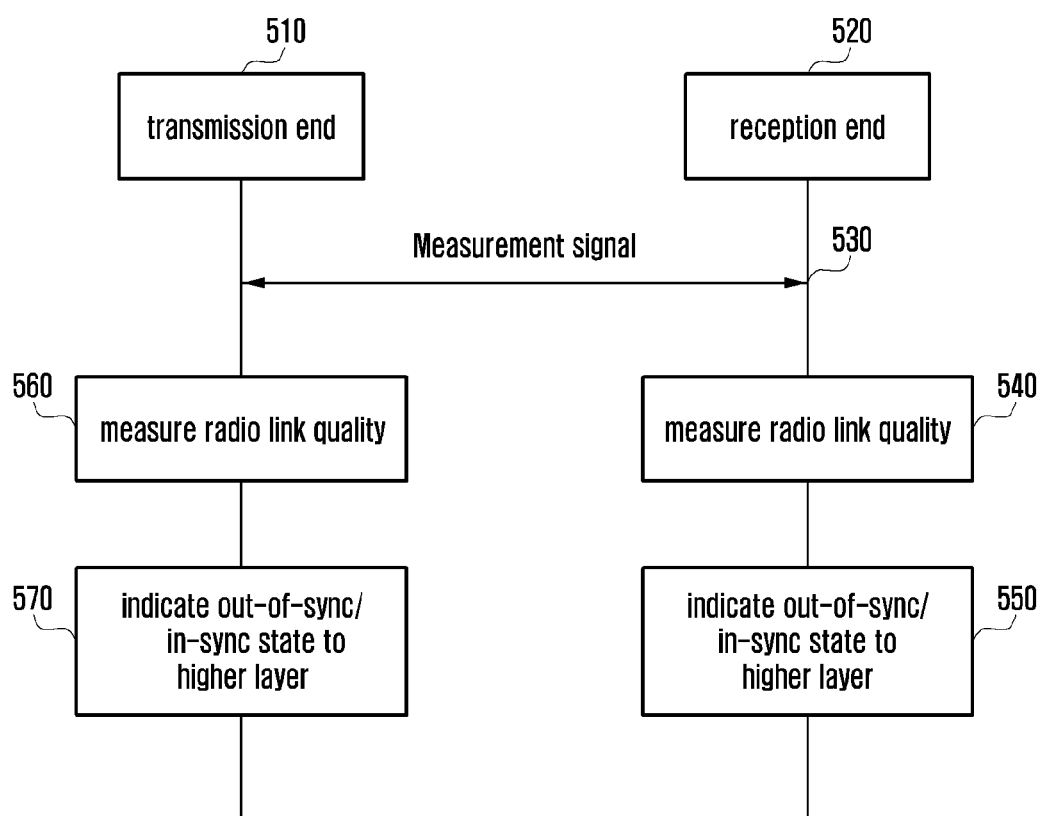
FIG. 5 illustrates a diagram of another example of a method of performing RLM in an NR V2X system.

FIG. 5 illustrates a diagram of another example of a method of performing RLM in an NR V2X system.

Unlike FIG. 4, FIG. 5 illustrates a method of performing RLM in a transmission end and a reception end. FIG. 5 illustrates a transmission end 510 and a reception end 520. Generally, a transmission end and a reception end may be understood as a subject of transmitting a signal and a subject of receiving a signal. In the V2X system, a terminal may be a transmission end or a reception end. Also, the reception end 520 may be a single terminal or may be multiple terminals. In a scenario such as platooning, the reception end 520 may be multiple terminals.

For RLM, the transmission end transmits a measurement signal and the reception end receives the same in operation 530. Also, unlike FIG. 4, the reception end may also transmit a measurement signal to the transmission and, and the transmission end may receive the same. Therefore, the reception end may measure a communication link quality in operation 540, and may indicate an out-of-synch state or an in-synch state to the higher layer using the measurement in operation 550. Also, the transmission end may measure a communication link quality in operation 560, and may indicate an out-of-synch state or an in-synch state to the higher layer using the measurement in operation 570. Here, the terms, "out-of-sync" or "in-sync" may be replaced with other terms.

The method of performing RLM in an NR V2X system has been described with reference to FIGS. 4 and 5. In the NR V2X system, the following signals may be considered as a measurement signal used for RLM.

- SL SS/PBCH: refers to a sidelink synchronization signal block, and the SL SS/PBCH may include a sidelink synchronization signal, which includes a sidelink primary synchronization signal (SL PSS) and a sidelink secondary synchronization signal (SL SSS), and a physical sidelink broadcast channel (PSBCH).
- SL CSI-RS: refers to a channel state information reference signal (CSR-RS) transmitted in a sidelink.
- SL DMRS: refers to a demodulation reference signal (DMRS) transmitted in a sidelink.
- SL PTRS: refers to a phase tracking reference signal (PTRS) transmitted in a sidelink.

In the NR V2X system, a measurement signal used for RLM is not limited to the above-mentioned candidates. One or more of the candidate signals may be considered to be a measurement signal, and selection of a corresponding measurement signal and configuration information associated with the measurement signal may be signaled by a radio resource control (RRC, hereinafter referred to as a Uu-RRC) configured by a base station or a radio resource control (RRC, hereinafter referred to as a PC-5 RRC) configured by a terminal.

Also, if a measurement signal used for RLM is configured to be measured restrictively in a predetermined slot. A base station or a terminal may configure one or more sets of slots for measuring a communication link quality for RLM, and may enable RLM measurement in the configured sets of slots. When configuring one or more sets of slots for measuring a communication link quality for RLM, different sets may include different slots and the slots do not overlap each other. In this instance, the set of slots for measuring a communication link quality for RLM may be configured by the Uu-RRC or a PC5-RRC. A set of slots for measuring a communication link quality for RLM is configured and a terminal is enabled to measure RLM in the corresponding set of slots, so that more accurate RLM measurement may be provided, which takes into consideration an interference environment that varies over time in an environment where interference exists.

Subsequently, operation of a terminal after RLM is performed in the NR V2X system is provided.

If the method of performing RLM in only a reception end is applied as illustrated in FIG. 4, a terminal corresponding to the reception end may perform an RLF related operation based on the result of RLM. If "out-of-sync" is successively indicated by a lower layer, a higher layer of a terminal may operate an RLM-related timer. If "in-sync" is successfully indicated by the lower layer, an RLM-related timer may be suspended. If a timer, which starts operation, expires, the terminal corresponding to the reception end may determine that the RLF occurs, may suspend an RLM-related timer, and may perform one or more of the following procedures in order to restore a link.

- The terminal corresponding to the reception end suspends sidelink transmission.
  - sidelink transmission to be released may include one or more of the followings:
  - semi-persistent scheduling (SPS), channel state information (CSI) feedback including a channel quality indicator (CQI), a HARQ feedback, a sounding reference signal (SRS), and a scheduling request (SR).

In order to restore and reestablish a sidelink, the terminal corresponding to the reception end may perform one or more of the following methods:

- The terminal corresponding to the reception end informs a base station that a corresponding sidelink is in an RLF state. The operation may correspond to the case of an in-coverage terminal.
- The terminal corresponding to the reception end requests a base station to release a corresponding sidelink. The operation may correspond to the case of an in-coverage terminal.
- The terminal corresponding to the reception end attempts to perform SL SS/PBCH block transmission. The operation may be performed by an in-coverage terminal and an out-of-coverage terminal.

Also, the method of performing RLM in only a reception end is applied as illustrated in FIG. 4, a terminal corresponding to a transmission end may not perform procedures 440 and 450 for RLM, unlike a terminal corresponding to the reception end, but may indirectly recognize a link quality and may determine an out-of-sync state or an in-sync state. A detailed method thereof is described with reference to a second embodiment. As described above, a sidelink of V2X is communication between terminals. Accordingly, if the link quality is poor, a transmission terminal, as well as a reception terminal that receives data, may reduce the power consumption via RLM and RLF (since data transmission may be prevented when communication condition is poor). In the case in which RLM and RLF are supported in a terminal that transmits data, if the link quality associated with transmission is poor, a leader terminal of a group in a service scenario, such as platooning, may transfer a leader function to another terminal so as to support more reliable platooning. Therefore, if the terminal corresponding to the transmission end determines that the sidelink is RLF according to a method of the second embodiment, the terminal corresponding to the transmission end may perform one or more of the following procedures in order to restore a link.

- The terminal corresponding to the transmission end may suspend sidelink transmission.
  - In this instance, the terminal corresponding to the transmission end may request a higher layer to transmit a keep alive message, before suspending transmission. The keep alive message may be transmitted to a terminal corresponding to a reception end via a PC5 interface.
- The terminal corresponding to the transmission end may perform sidelink transmission in a fallback mode. The fallback mode may be a mode for transmitting data using small-sized scheduling information (which may correspond to sidelink control information (SCI) in the disclosure). That is, the transmission end may transmit scheduling information using an SCI format having a smaller number of bits than that of an SCI format which is conventionally used.
- In order to restore and reestablish a sidelink, the terminal corresponding to the transmission end may perform one or more of the following methods:
  - The terminal corresponding to the transmission end informs a base station that a corresponding sidelink is in an RLF state. The operation may correspond to the case of an in-coverage terminal.
  - The terminal corresponding to the transmission end requests a base station to release a corresponding sidelink. The operation may correspond to the case of an in-coverage terminal.

The terminal corresponding to the transmission end may request change of a leader terminal in the case of platooning. The operation may be performed together with or separately from releasing a corresponding sidelink.

The terminal corresponding to the transmission end attempts to perform SL SS/PBCH block transmission. The operation may be performed by an in-coverage terminal and an out-of-coverage terminal.

If the method of performing RLM in a transmission end and a reception end is applied as illustrated in FIG. 5, a terminal corresponding to the reception end may perform an RLF related operation based on the result of RLM, first. If "out-of-sync" is successively indicated by a lower layer, a higher layer may operate an RLM-related timer. If "in-sync" is successfully indicated by the lower layer, an RLM-related timer may be suspended. If a timer, which starts operation, expires, the terminal corresponding to the reception end may determine that the RLF occurs, may suspend an RLM-related timer, and may perform one or more of the following procedures in order to restore a link.

The terminal corresponding to the reception end suspends sidelink transmission.

Sidelink transmission to be released may include one or more of the followings:

semi-persistent scheduling (SPS), channel state information (CSI) feedback including a channel quality indicator (CQI), a HARQ feedback, a sounding reference signal (SRS), and a scheduling request (SR).

In order to restore and reestablish a sidelink, the terminal corresponding to the reception end may perform one or more of the following methods:

The terminal corresponding to the reception end informs a base station that a corresponding sidelink is in an RLF state. The operation may correspond to the case of an in-coverage terminal.

The terminal corresponding to the reception end requests a base station to release a corresponding sidelink. The operation may correspond to the case of an in-coverage terminal.

The terminal corresponding to the reception end attempts to perform SL SS/PBCH block transmission. The operation may be performed by the in-coverage terminal and the out-of-coverage terminal.

Also, since the transmission end also performs RLM according to FIG. 5, the terminal corresponding to the transmission end may perform an RLF-related operation based on the result of RLM. If "out-of-sync" is successively indicated by a lower layer, a higher layer may operate an RLM-related timer. If "in-sync" is successfully indicated by the lower layer, an RLM-related timer may be suspended. If a timer, which starts operation, expires, the terminal corresponding to the transmission end may determine that it is RLF, may suspend an RLM-related timer, and may perform one or more of the following procedures in order to restore a link.

The terminal corresponding to the transmission end may suspend sidelink transmission.

In this instance, the terminal corresponding to the transmission end may request a higher layer to transmit a keep alive message, before suspending transmission. The keep alive message may be transmitted to a terminal corresponding to the reception end via a PC5 interface.

The terminal corresponding to the transmission end may perform sidelink transmission in a fallback mode. The fallback mode may be a mode for transmitting data using small-sized scheduling information (which may correspond to sidelink control information (SCI) in the disclosure). That is, the transmission end may transmit scheduling information using an SCI format having a smaller number of bits than that of an SCI format which is conventionally used.

In order to restore and reestablish a sidelink, the terminal corresponding to the transmission end may perform one or more of the following methods:

The terminal corresponding to the transmission end informs a base station that a corresponding sidelink is in an RLF state. The operation may correspond to the case of an in-coverage terminal.

The terminal corresponding to the transmission end requests a base station to release a corresponding sidelink. The operation may correspond to the case of an in-coverage terminal.

The terminal corresponding to the transmission end may request change of a leader terminal in the case of platooning. The operation may be performed together with or separately from releasing a corresponding sidelink.

The terminal corresponding to the transmission end attempts to perform SL SS/PBCH block transmission. The operation may be performed by an in-coverage terminal and an out-of-coverage terminal.

Also, if a signaling that requests releasing a link is introduced for the case in which a terminal desires to suspend connection of a sidelink irrespective of the result of RLM and RLF in the NR V2X system, sidelink communication may be performed more reliably. For example, in a platooning scenario, when a terminal, which is in platooning, desires to be out from the platooning, if the terminal transmits a signaling that request releasing a link to a terminal in the group, the terminal in the group may receive the corresponding signaling and may not perform unnecessary RLM. In this instance, prompt signaling may be needed and thus, releasing a link may be requested using 1-bit information included in the SCI. For example, if one-bit is set to "1", a terminal that receives the SCI may understand that a terminal that transmits the SCI requests releasing a sidelink. The corresponding signaling is not limited to the platooning scenario, and may be considered only for unicast and groupcast communication, as opposed to broadcast communication. Also, both the terminal corresponding to the transmission end and the terminal corresponding to the reception end may transmit a signaling for requesting releasing a link.

Figure 6:
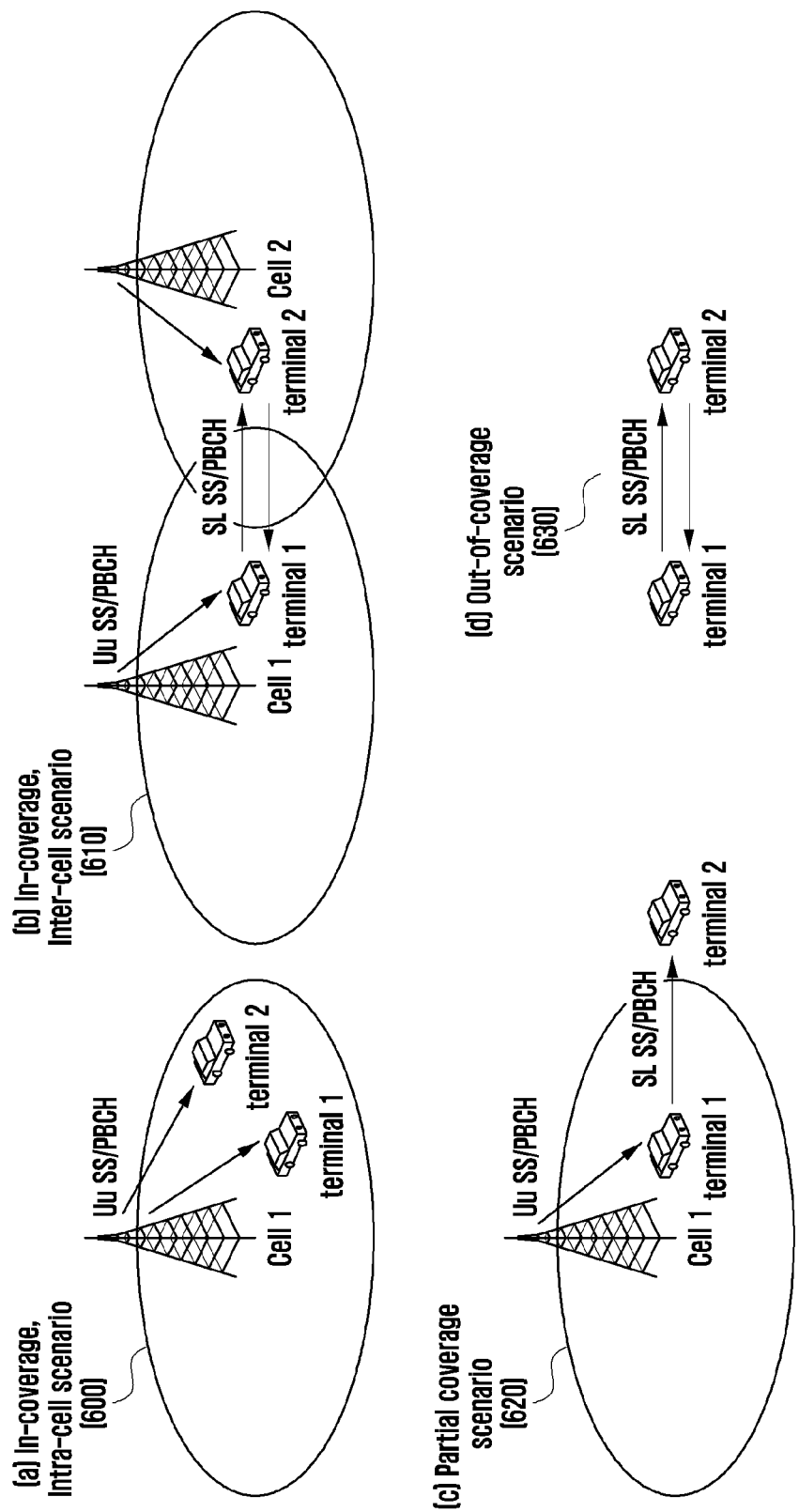
FIG. 6 illustrates a diagram of an example of indicating whether to transmit an SL SS/PBCH block according to a scenario in a V2X communication method implemented using a sidelink.

FIG. 6 illustrates a diagram of an example of indicating whether to transmit an SL SS/PBCH block according to a scenario in a V2X communication method implemented using a sidelink.

It has been described that a signal, such as an SL SS/PBCH, an SL CSI-RS, an SL DMRS, and an SL PTRS, may be used as a measurement signal for RLM in the NR V2X system. FIG. 6 illustrates a diagram of the case in which an SL SS/PBCH is incapable of being used as a measurement signal for RLM according to a V2X scenario.

Diagram 600 illustrates a scenario in which both terminal 1 and terminal 2 are present in a cell coverage area, and two terminals access a single base station. In the scenario, two terminals perform synchronization using a Uu SS/PBCH transmitted by the base station. Accordingly, if terminal 1 and terminal 2 perform communication using a sidelink, an SL SS/PBCH is not transmitted.

Diagram 610 illustrates a scenario in which both terminal 1 and terminal 2 are present in a cell coverage area, but the terminal 1 and the terminal 2 access different base stations and the base stations share V2X-related resource pool information. In the scenario, when the terminal 1 and terminal 2 perform communication using a sidelink, an SL SS/PBCH may or may not be transmitted depending on a condition. On condition that the terminal 1 and the terminal 2 are respectively synchronized with corresponding base stations, and the different base stations are synchronized, if the terminal 1 and the terminal 2 perform communication using a sidelink, an SL SS/PBCH is not transmitted.

Otherwise, the corresponding base station transmits, to the corresponding terminal, an indication indicating that synchronization needs to be established via V2X system information. If the terminal 1 and terminal 2 perform communication using a sidelink, an SL SS/PBCH may be transmitted.

Subsequently, diagram 620 illustrates the case in which terminal 1 is present in a cell coverage area but terminal 2 is outside the cell coverage area. In the scenario, the terminal 1 may transmit an SL SS/PBCH when the reference signals received power (RSRP) of the terminal 1 is lower than a threshold point set by the base station. Then, the terminal 2 may obtain synchronization using an SL SS/PBCH transmitted by the terminal 1 in the cell coverage area.

Diagram 630 illustrates a scenario in which terminal 1 and terminal 2 are outside a cell coverage area. In the scenario, synchronization may be achieved using an SL SS/PBCH transmitted by the terminal 1 or the terminal 2.

As illustrated in FIG. 6, there may be a case in which an SL SS/PBCH is incapable of being used as a measurement signal for RLM depending on a V2X scenario. That is, in diagrams 600 and 610, if an indication indicating that synchronization is needed is not transmitted from the base station to a corresponding terminal, an SL SS/PBCH is not transmitted. Also, there may be a terminal that is incapable of transmitting an SL SS/PBCH due to the capability of the terminal. Therefore, configuration of an RLM measurement signal may be considered as follows.

Alternative 1: In an environment where an SL SS/PBCH is transmittable, an SL SS/PBCH is used as an RLM measurement signal. Otherwise, one or more of an SL CSI-RS, an SL DMRS, and an SL PTRS may be used as an RLM measurement signal.

As illustrated in FIG. 6, that is, in diagrams 600 and 610, if an indication indicating that synchronization is needed is not transmitted from a base station to a corresponding terminal, an SL SS/PBCH may not be used as an RLM measurement signal.

Also, for a terminal that is incapable of transmitting an SL SS/PBCH due to the capability of the terminal, an SL SS/PBCH may not be used as an RLM measurement signal.

Alternative 2: An SL SS/PBCH and one or more of an SL CSI-RS, an SL DMRS, and an SL PTRS may be used as RLM measurement signals.

Even in an environment in which an SL SS/PBCH is transmittable, an SL CSI-RS, an SL DMRS, and an SL PTRS, in addition to the SL SS/PBCH, may be configured as RLM measurement signals.

Alternative 3: An SL SS/PBCH is not used as an RLM measurement signal. One or more of an SL CSI-RS, an SL DMRS, and an SL PTRS may be used as RLM measurement signals.

Figure 7:
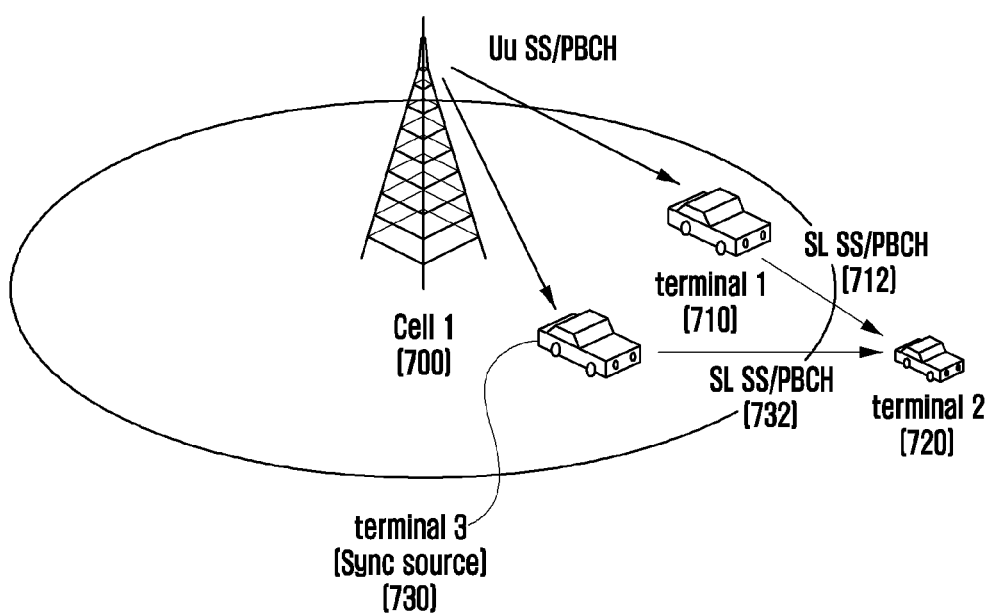
FIG. 7 illustrates a diagram of an example of using an SL SS/PBCH as an RLM measurement signal, if the SL SS/PBCH is transmitted from a terminal which is different from a terminal that transmit data, in a V2X communication method implemented using a sidelink.

FIG. 7 illustrates a diagram of an example of using an SL SS/PBCH as an RLM measurement signal if the SL SS/PBCH is transmitted from a terminal which is different from a terminal that transmits data, in a V2X communication method implemented using a sidelink.

According to FIG. 7, terminal 1 710 is a transmission end that transmits data, and terminal 2 720 is a reception end that receives data that the terminal 1 710 transmits. As illustrated in FIG. 7, the terminal 1 710 and terminal 3 730 are present in a cell coverage area 700, but the terminal 2 720 is outside the cell coverage area. In this instance, the terminal 2 720 may achieve synchronization based on an SL SS/PBCH 732 transmitted by the terminal 1 710 or terminal 3 730 which is present in the cell coverage area 700.

If only a broadcast communication environment is taken into consideration, RLM and RLF procedures are not needed. Accordingly, the terminal 2 720 is synchronized based on an SL SS/PBCH 712 or 732 transmitted by the terminal 1 710 or terminal 3 730, and receives data transmitted by the terminal 1 710. However, in the unicast and groupcast communication, it is important to secure continuous connection of a service and thus, the RLM and RLF procedures may be needed. If the terminal 2 720 receives the SL SS/PBCH block 712 transmitted by the terminal 1 710 and achieves synchronization, the SL SS/PBCH block 712 may be valid as a measurement signal for RLM. However, as illustrated in FIG. 7, if the terminal 2 720 receives the SL SS/PBCH block 732 transmitted by the terminal 3 730, achieves synchronization, and receives data transmitted by the terminal 1 710, the SL SS/PBCH block 732 transmitted by the terminal 3 730 is transmitted via the link between the terminal 3 730 and the terminal 2 720, and thus, the SL SS/PBCH block 732 may not be an RLM measurement signal valid for recognizing a link quality between the terminal 1 710 and the terminal 2 720.

Therefore, if an SL SS/PBCH block is used as a measurement signal for RLM between a transmission end and a reception end in a sidelink environment where unicast and groupcast communication are supported, there may be a case in which the SL SS/PBCH block is invalid as a measurement signal for RLM, as illustrated in FIG. 7. Therefore, as the method of using an SL SS/PBCH block as a measurement signal for RLM in the NR V2X system, the following methods may be considered.

In the unicast and groupcast communication, a method of using an SL SS/PBCH block as a measurement signal for RLM is as follows.

Alt-1: allows an SL SS/PBCH block, which is invalid for RLM (i.e., an SL SS/PBCH block transmitted via a link which is different from a sidelink, of which the communication link quality is to be measured), to be used as a measurement for RLM.

Alt-2: uses a virtual cell ID for transmission of an SL SS/PBCH block which is valid for RLM (i.e., an SL SS/PBCH block transmitted using a sidelink, of which the communication link quality is to be measured).

Alt-3: groups physical cell IDs (or cell IDs) by distinguishing broadcast from unicast and groupcast.

Among the methods, Alt-1 is a method of allowing an SL SS/PBCH block, based on which synchronization is achieved, to be used as a measurement signal for RLM even though synchronization is achieved using the SL SS/PBCH block which is invalid for RLM. In the case of Alt-1, the unicast and groupcast communication may not need to introduce an additional method for using an SL SS/PBCH block as a measurement signal for RLM, but the accuracy of RLM may be low, which is a drawback. Alt-2 will be described in detail with reference to a third embodiment, and Alt-3 will be described in detail with reference to a fourth embodiment.

Second Embodiment

The second embodiment provides a method in which a terminal corresponding to a transmission end (although not performing a procedure for RLM unlike a terminal corresponding to a reception end) indirectly recognizes a link quality and determines an out-of-sync state or in-sync state, if the method of performing RLM in only a reception end is applied as illustrated in FIG. 4. Here, the terms, "out-of-sync" or "in-sync" may be replaced with other terms. The terminal corresponding to the transmission end may need to recognize a link quality using an indirect method since the terminal corresponding to the transmission end does not receive a measurement signal for RLM. In this instance, the following methods may be considered.

SL HARQ-ACK/NACK
SL HARQ-NACK
SL CSI feedback

In the NR V2X system, it is planned to support introduction of sidelink HARQ ACK/NACK and channel state information (CSI) feedback (hereinafter, interchangeably used with feedback information) in a sidelink environment where unicast and groupcast communication are supported. In the case of HARQ, both a HARQ-ACK and a HARQ-NACK are supported in the unicast communication (i.e., both a reception acknowledgement (ACK) and a reception non-acknowledgement (NACK) are supported). However, in the groupcast communication, only a HARQ-NACK is supported due to feedback overhead. In the case of a CSI feedback, the terminal corresponding to the transmission end may receive CSI feedback information periodically, aperiodically, or semi-persistently based on CSI-RS configuration and channel state information report (CSI report) configuration. Therefore, the terminal corresponding to the transmission end may use the above-mentioned feedback information to determine an out-of-sync state or an in-sync state according to the following procedures.

The terminal corresponding to the transmission end defines a threshold point X for determining an out-of-sync state or an in-sync state.

The threshold point X indicates the length of a time duration during which reception does not occur after the feedback information, such as the above-described SL HARQ-ACK/NACK, SL HARQ NACK, or CSI feedback, is received last.

The value associated with the threshold point X may be configured via an Uu-RRC or a PC5-RRC. Alternatively, the value may be defined in the standard.

If feedback information is not received during the configured threshold point X, the physical layer of the terminal corresponding to transmission end may indicate, to a higher layer, that a link quality is "out-of-sync".

If the link quality is identified as being "out-of-sync", the threshold point X may be updated to be double the previous threshold point value.

If feedback information is received within the configured threshold point X, the physical layer of the terminal corresponding to the transmission end may indicate that a link quality is "in-sync".

If the link quality is identified as being "in-sync", the threshold point X may be maintained to be equal to the previous threshold point value.

The terminal corresponding to the transmission end may recognize an "out-of-sync" state or an "in-sync" state according to the above-described method, and the terminal may perform an RLF-related operation based on the result. If "out-of-sync" is successively indicated by a lower layer, a higher layer of the terminal corresponding to the transmission end may operate an RLM-related timer. If "in-sync" is successively indicated by the lower layer, an RLM-related timer may be suspended. If the timer, which starts operation, expires, the terminal corresponding to the transmission end may determine that it is an RLF.

Third Embodiment

The third embodiment describes Alt-2 in detail among the methods of using an SL SS/PBCH block as a measurement signal for RLM in the unicast and groupcast communication. The embodiment below suggests a method of using a virtual cell ID for transmission of an SL SS/PBCH block valid for RLM as a method of using an SL SS/PBCH block as a measurement signal for RLM. However, the proposal of the disclosure is not limited to the usage of a measurement signal for RLM.

In the third embodiment, a procedure for transmitting an SL SS/PBCH block valid for RLM using a virtual cell ID may be performed as follows.

In the case of transmission of an SL SS/PBCH block by a terminal within a cell coverage area, the terminal may transmit an SL SS/PBCH block generated using a physical cell ID.

A terminal that is outside the cell coverage area searches for a synchronization signal, and if a synchronization signal is retrieved, the terminal performs synchronization using the same.

After synchronization, if communication performed between the transmission end and the reception end is unicast and groupcast communication, a terminal within the cell coverage area may transmit an SL SS/PBCH block generated using a virtual cell ID, when transmitting an SL SS/PBCH block.

The virtual cell ID is used for unicast and groupcast. The virtual cell ID may be set to be different from each other, or may be set to be the same, for unicast and groupcast.

If the resource pool (time and frequency resource regions) for unicast and groupcast is configured separately from the resource pool for broadcast, the virtual cell ID may be understood as an ID corresponding to the resource pool for unicast and groupcast.

A terminal outside the cell coverage area may use an SL SS/PBCH generated using a virtual cell ID as a measurement signal for RLM. In this instance, a terminal related to unicast transmission or reception may use an SL SS/PBCH as a measurement signal using a virtual cell ID for unicast. A terminal related to groupcast transmission or reception may use an SL SS/PBCH as a measurement signal using a virtual cell ID for groupcast. Alternatively, a terminal related to unicast and groupcast transmission or reception may use an SL SS/PBCH as a measurement signal using a virtual cell ID for unicast and groupcast.

The terminal may reselect an SL SS/PBCH generated using a virtual cell ID as a new synchronization source, and may use the same for achieving synchronization.

According to the above-described method, an SL SS/PBCH block may be used as a measurement signal valid for RLM in the unicast and groupcast communication.

Fourth Embodiment

The fourth embodiment describes Alt-3 in detail among the methods of using an SL SS/PBCH block as a measurement signal for RLM in the unicast and groupcast communication. Although the embodiment suggests a method of grouping physical cell IDs by distinguishing broadcast from unicast and groupcast as a method of using an SL SS/PBCH block as a measurement signal for RLM, the proposal of the disclosure is not limited to the usage of a measurement signal for RLM. In other words, the content of the disclosure may be a method of designing a synchronization signal for a sidelink. In the NR V2X system, unicast and groupcast communication, in addition to broadcast communication, may be supported. Also, as described in FIG. 7, there may be a case in which an SL SS/PBCH is invalid as a measurement signal for RLM in the unicast and groupcast communication. Therefore, a synchronization signal needs to be designed to be suitable for a communication environment.

In the case of an NR system, 1008 physical cell IDs are present, and the physical cell IDs are divided into four groups. In this instance, each group may include 252 unique physical cell IDs. In this instance, physical cell ID $N_{ID}^{cell}$ may be expressed by a formula as given below.

$$N_{ID}^{cell}=4N_{ID}^{(1)}+N_{ID}^{(2)} \quad \text{Equation 1}$$

In Equation 1, $N_{ID}^{(1)} \in \{0,1,2,3\}$ and indicates a physical cell ID group, and $N_{ID}^{(2)} \in \{0,1,2,3\}$ and indicates a physical cell ID in a physical cell ID group.

In this instance, physical sidelink ID $N_{ID}^{SL}$ may have $N_{ID}^{SL} \in \{0,1, \ldots, 1007\}$, and the IDs may be grouped into four groups depending on the purpose of usage, as below.
Group 1: $\{0,1, \ldots ,251\}$
Group 2: $\{252,253, \ldots ,503\}$
Group 3: $\{504,505, \ldots ,755\}$
Group 4: $\{755,756, \ldots ,1007\}$ The physical sidelink IDs are grouped into four groups in order to distinguish broadcast from unicast and groupcast, and also, to identify whether a terminal that transmits an SS/PBCH block is inside or outside a cell coverage area. Therefore, the physical cell ID group may be classified according to the following purposes.
broadcast, in the case of in-coverage
unicast and groupcast, in the case of in-coverage
broadcast, in the case of out-of-coverage
unicast and groupcast, in the case of out-of-coverage
For example, grouping as shown below may be possible. However, the order of grouping may be changeable.
Group 1: broadcast, in the case of in-coverage
Group 2: —unicast and groupcast, in the case of in-coverage
Group 3: broadcast, in the case of out-of-coverage
Group 4: —unicast and groupcast, in the case of out-of-coverage According to the above-described method, an SL SS/PBCH block may be used as a measurement signal valid for RLM in the unicast and groupcast communication.

In association with identifying in-coverage and out-of-coverage, if a cell having a frequency, which is configured to perform a sidelink operation and satisfies an S criterion (which is a criterion for cell selection or cell reselection), is not detected, the terminal may determine that the terminal itself is out-of-coverage. TS 36.304 Section 11.4 provides a detailed description thereof.

Also, whether the terminal is to perform broadcast, unicast, or groupcast transmission or reception may be configured via a higher layer signal.

Figure 8:
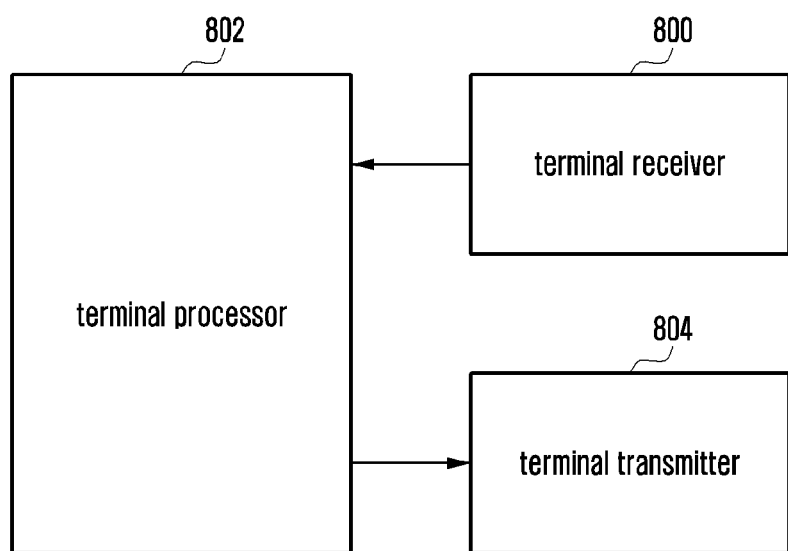
FIG. 8 illustrates a block diagram of an internal structure of a terminal according to an embodiment.
Figure 9:
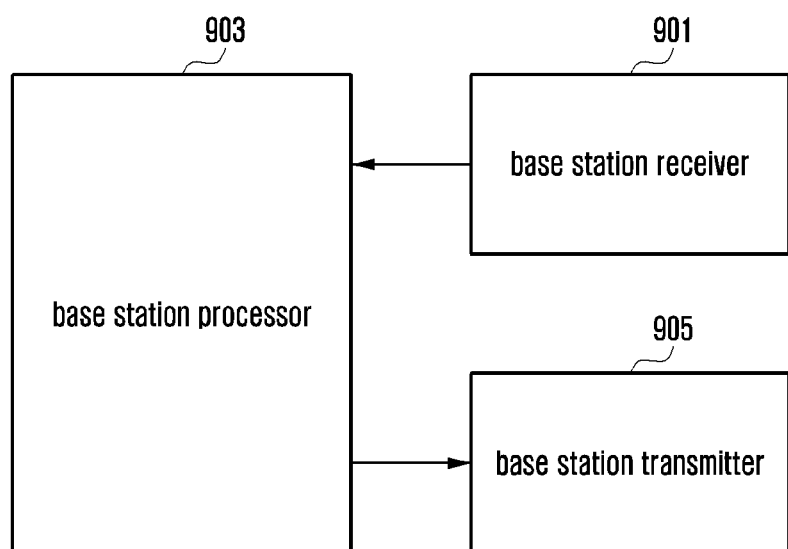
FIG. 9 illustrates a block diagram of an internal structure of a base station according to an embodiment.

The devices for implementing the embodiments are illustrated in FIGS. 8 and 9.

FIG. 8 illustrates a block diagram of an internal structure of a terminal according to an embodiment. As illustrated in FIG. 8, the terminal may include a terminal receiver 800, a terminal transmitter 804, and a terminal processor 802. The terminal receiver 800 and the terminal transmitter 804 are commonly called a transceiver in the embodiment. The transceiver may perform transmission or reception of a signal with a base station or another terminal. The signal may include a synchronization signal, a reference signal, control information, and data. To this end, the transceiver includes an RF transmitter that up-converts and amplifies a frequency of a transmitted signal, an RF receiver that low-noise amplifies a received signal and down-converts the frequency, and the like. Also, the transceiver outputs, to the terminal processor 802, a signal received via a wireless channel, and transmits a signal output from the terminal processor 802 via a wireless channel. The terminal processor 802 may control a series of processes such that the terminal operates according to the above-described embodiments.

FIG. 9 illustrates a block diagram of an internal structure of a base station according to an embodiment. As illustrated in FIG. 9, the base station may include a base station receiver 901, a base station transmitter 905, and a base station processor 903. The base station receiver 901 and the base station transmitter 905 are commonly called a transceiver in the embodiments. The transceiver may perform transmission or reception of a signal with a terminal. The signal may include a synchronization signal, control information, and data. To this end, the transceiver includes an RF transmitter that up-converts and amplifies a frequency of a transmitted signal, an RF receiver that low-noise amplifies a received signal and down-converts the frequency, and the like. Also, the transceiver outputs, to the base station processor 903, a signal received via a wireless channel, and transmits a signal output from the base station processor 903 via a wireless channel. The base station processor 903 may control a series of processes such that the base station operates according to the above-described embodiments.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first terminal in a communication system, the method comprising:
determining that a sidelink radio link failure (RLF) is detected based on sidelink hybrid automatic repeat request (HARQ) information in response to sidelink data from a second terminal;
indicating a detection of the sidelink RLF to a higher layer; and
transmitting, to a base station, a message including information indicating that the sidelink RLF between the first terminal and the second terminal occurs,
wherein the first terminal is connected with the base station,
wherein it is determined that the sidelink RLF is detected in response to the sidelink HARQ information being not received during a threshold, and
wherein the threshold is associated with a timing of a last reception of the sidelink HARQ information.

2. The method of claim 1, wherein a sidelink synchronization signal/physical broadcast channel (SS/PBCH) block is communicated between the first terminal and the second terminal.

3. The method of claim 1, further comprising:
transmitting, to the second terminal, the sidelink data.

4. The method of claim 1, wherein the threshold is configured by higher layer signaling from the second terminal.

5. The method of claim 1, wherein the threshold is preconfigured or configured by higher layer signaling received from the base station.

6. The method of claim 1, wherein the sidelink HARQ information comprises HARQ-ACK/NACK or HARQ-NACK.

7. A first terminal in a communication system, the first terminal comprising:
a transceiver; and
a controller coupled with the transceiver and configured to:
determine that a sidelink radio link failure (RLF) is detected based on sidelink hybrid automatic repeat request (HARQ) information in response to sidelink data from a second terminal,
indicate a detection of the sidelink RLF to a higher layer, and
transmit, to a base station, a message including information indicating that the sidelink RLF between the first terminal and the second terminal occurs,
wherein the first terminal is connected with the base station,
wherein it is determined that the sidelink RLF is detected in response to the sidelink HARQ information being not received during a threshold, and
wherein the threshold is associated with a timing of a last reception of the sidelink HARQ information.

8. The first terminal of claim 7, wherein a sidelink synchronization signal/physical broadcast channel (SS/PBCH) block is communicated between the first terminal and the second terminal.

9. The first terminal of claim 7, wherein the controller is further configured to transmit, to the second terminal, the sidelink data.

10. The first terminal of claim 7, wherein the threshold is configured by higher layer signaling from the second terminal.

11. The first terminal of claim 7, wherein the threshold is preconfigured or configured by higher layer signaling received from the base station.

12. The first terminal of claim 7, wherein the sidelink HARQ information comprises HARQ-ACK/NACK or HARQ-NACK.

* * * * *